(No Model.)
H. BUSHNELL.
COUPLING FOR CONNECTING A SERIES OF TUBES.
No. 355,137. Patented Dec. 28, 1886.
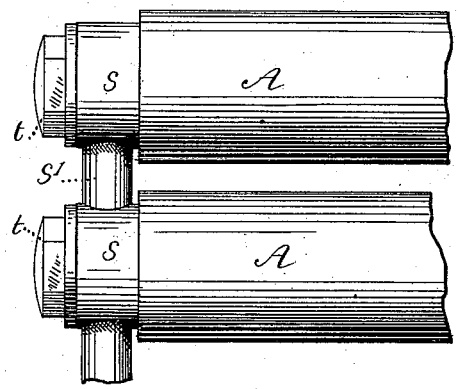
Fig. 1
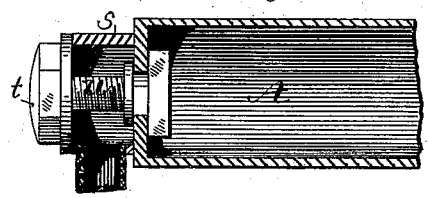
Fig. 2
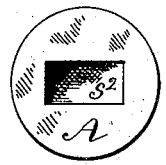  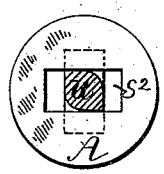
Fig. 3   Fig. 4   Fig. 5
WITNESSES:
George L. Barnes.
John H. Whiting
INVENTOR
Henry Bushnell.
BY Julius Twiss,
ATTORNEY

UNITED STATES PATENT OFFICE.

HENRY BUSHNELL, OF NEW HAVEN, CONNECTICUT.

COUPLING FOR CONNECTING A SERIES OF TUBES.

SPECIFICATION forming part of Letters Patent No. 355,137, dated December 28, 1886.

Application filed April 6, 1886. Serial No. 198,014. (No model.)

*To all whom it may concern:*

Be it known that I, HENRY BUSHNELL, a resident of New Haven, Connecticut, have invented new and useful Improvements in Couplings for Connecting a Series of Tubes, of which the following is a specification.

The object of my invention is to provide a coupling for connecting a series of tubes or reservoirs for holding compressed air or other expansive fluids or gases, especially in compressed-air locomotors or road vehicles.

The invention consists in the novel construction of the coupling, as hereinafter more fully described and claimed.

In the accompanying drawings, Figure 1 is a view of a pair of reservoir-tubes connected by my improved coupling. Fig. 2 is a central section through one of the tubes. Fig. 3 is an end view of a tube. Fig. 4 is an end view of the coupling-bolt, and Fig. 5 is an end view of a tube with the bolt shown in section through the plane of the tube-head.

Referring to the drawings, A designates a series of hollow tubes or reservoirs arranged side by side in a cluster, and coupled together at one end by connecting-pipes and circular chambers $s$, formed integral coincident with the tubes. The chambers are fitted against the ends of the tubes and are faced off on the opposite side to receive suitable caps or covers, $t$. A rectangular opening, $s^2$, is made through the end of each reservoir-tube coincident with the center of the chamber $s$. A bolt, $u$, is arranged centrally in each chamber through the rectangular opening, with its head on the inside of the tube and its threaded end screwed into the cap $t$, thus holding the caps, couplings, and tubes securely together. The head of the bolt is made of the same shape as the opening in the tube, and just large enough to pass through it. The bolt-head is entered through the orifice and then turned at right angles therewith, in which position the ends of the heads bear upon and hold on the inside of the tube.

The bolt is formed with a neck under its head, of the shape shown, having opposite square corners which bear on the sides of the orifice when the head of the bolt is at right angles therewith, and prevent the bolt from being turned past that position. This construction is necessary to hold the bolts stationary and prevent them from turning while the caps are being screwed upon them. The caps clamp the connecting pipe or shell $s'$ against the tubes, and suitable packing may be interposed between the caps, casing, and tubes, if desired. The orifices $s^2$ afford free communication between the tubes and the connecting-pipe $s'$, which may be extended to connect any required number of tubes.

This coupling is easily attached to or removed from the tubes, and has plain flat joints throughout, which are easily fitted, and may be tightened at any time by simply screwing up the caps $t$.

I claim as new and desire to secure by Letters Patent—

In a coupling for connecting a series of tubes or reservoirs, the combination of the tubes A, having rectangular orifices $s^2$ in their heads at one end, the connecting parts $s\ s'$, the T-headed bolts $n$, arranged through the rectangular orifices in the heads and turned at right angles thereto, and the caps $t$, seated in the outer face of the connecting parts and screwed upon the T-headed bolts, all combined substantially in the manner and for the purpose specified.

HENRY BUSHNELL.

Witnesses:
GEORGE L. BARNES,
WM. J. ROOT.